United States Patent [19]

de Putter

[11] 3,999,925
[45] Dec. 28, 1976

[54] EXTRUDER FOR CORRUGATED TUBE

[75] Inventor: Warner Jan de Putter, Hardenberg, Netherlands

[73] Assignee: Wavin B.V., Handellaan Zwolle, Netherlands

[22] Filed: Sept. 10, 1974

[21] Appl. No.: 504,851

[30] Foreign Application Priority Data

Sept. 11, 1973 Netherlands ............ 7312536

[52] U.S. Cl. .................. 425/327; 425/371; 425/392
[51] Int. Cl.² .................................... B29D 23/04
[58] Field of Search ............ 74/243 R, 243 C; 425/371, 372, 327, 392, 393, 453, 454, 380, 445, 446; 264/173, 209, 286

[56] References Cited

UNITED STATES PATENTS

| | | | |
|---|---|---|---|
| 1,963,314 | 6/1934 | Savell et al. | 74/243 C X |
| 3,751,541 | 8/1973 | Hegler | 425/392 X |

FOREIGN PATENTS OR APPLICATIONS 2,062,695   6/1971   Netherlands ............ 425/392

*Primary Examiner*—Francis S. Husar
*Assistant Examiner*—Mark Rosenbaum
*Attorney, Agent, or Firm*—Edmund M. Jaskiewicz

[57] ABSTRACT

A device for manufacturing profiled hollow tubing comprising an extruder and two endless rows of die halves guided over guiding wheels provided with first recesses having one depth and second recesses which are shallower, such that subsequent moulds halves contact each other before coming into contact with the plastics tube as extruded.

3 Claims, 6 Drawing Figures

EXTRUDER FOR CORRUGATED TUBE

BACKGROUND OF THE INVENTION

The invention relates to a device for manufacturing profiled hollow tubing from synthetic plastics material, comprising an extruder with at least one annular mouth piece or opening, situated between a casing and at least one core, and two endless rows of consecutive die halves, each die half of which has a semi tubular profiled mould cavity, the rows being movable along endless guide ways extending parallel to each other in an operative track, the opposite halves of die in this operative track completing each other so as to form a hollow mould, comprising further a closing means retained in spaced relationship from the core and means for generating an inner overpressure in the space between the annular mouth piece and the aforementioned closing means, while each endless row consists of an inner and an outer half row, and spaced sprockets are disposed to move a die half from an outer half of row to an inner half of row in order to arrange two opposite die halves in such a way that they form a hollow mould.

Such a device is known per se. These known devices have the drawback that the halves of die complete each other with a tilting movement to a part of a hollow mould. During this tilting movement the velocity of the front- and back surfaces of the halves of die is greater at the moment of closing than the velocity in the preceding part of the track. This involves that the front faces of the die halves at the moment of closing of two opposite halves of die move faster than the soft polyvinyl chloride tubing which should be enclosed. As a consequence there is a possibility that the soft wall of the tubing is gripped by the halves of die and pushed forward whereby synthetic material lands in between the die halves. This synthetic material forms projections on the outer side of the tubing. The strength of the tubing is not helped by these projections and in general even a weakening is produced.

A greater drawback consists, however, in that such projections may cause grave disturbance in subsequent perforating apparatus.

Consequently much interest is taken in apparatus in which these difficulties are not experienced and in which the risk of the formation of projections owing to deformation of plastics between consecutive halves of dies in each endless row of die halves is avoided.

SUMMARY OF THE INVENTION

It is an object of the invention to obviate the aforementioned difficulties.

This object is attained according to the invention by the arrangement that the sprockets of each row proximate the extruder are so constructed that the leading face of a mold half is in contact with the adjoining trailing face of the next preceeding mold half when the mold half is moving into the closed position with an opposed mold half to form a complete hollow mold.

In this way it is impossible that synthetic plastics material lands between two consecutive die halves, so that the risk of disturbance is entirely avoided.

A completion of the halves of mould so as to form a mould is conveniently achieved by guiding the halves of die at the sprocket on the side of the extruder independently of each other on their front and back side in such a way that the halves of die which together should form a hollow mould, prior to completion, are at first caused to adjoin the preceding die halves.

The parallel completion of the die halves is efficiently obtained by pivotally securing the die halves to each other so as to form a chain, the chain running over a sprocket with two pitch circles, the leading pivotal points of the die halves cooperating with the smaller pitch circle of the sprocket wheel and the trailing pivotal points of the die halves cooperating with the larger pitch circle, the size of the circles being selected in such a way that the halves of die by their front face-lower sides adjoin the back faces of the preceding die halves at the moment that the leading pivotal point of the die half starts leaving the sprocket. Such a parallel contact of the preceding die halves with the die halves to be closed before the latter complete each other to thereby form a hollow mould is particularly advantageous, since no undesired deformation of the plastic tubing is observed, while the construction is very simple.

SURVEY OF THE DRAWINGS

Figure 1:
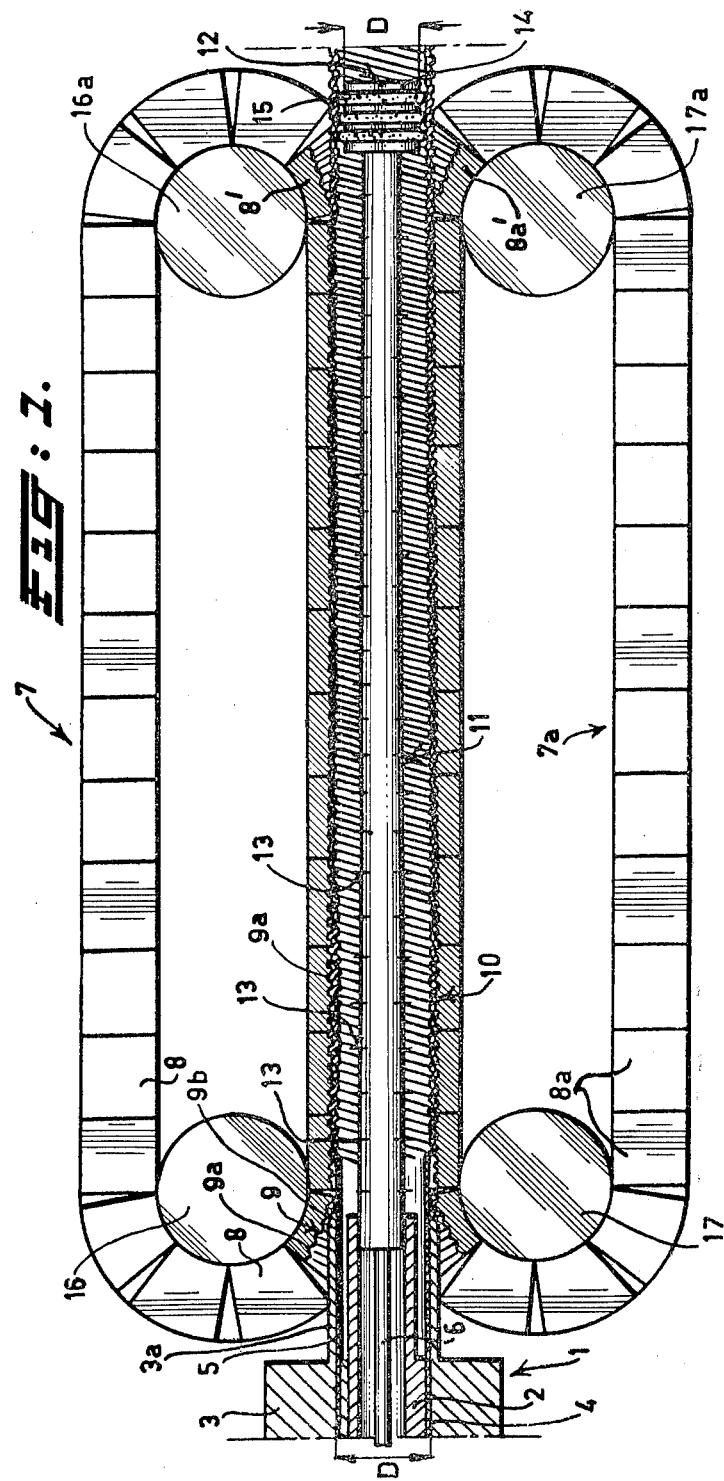
FIG. 1 shows diagrammatically a device according to the invention.

The device according to FIG. 1 shows an extruder 1 provided with a head consisting of a core 2 and a casing 3 whereinbetween an annular mouth piece 4 for extruding a tubing 5 of synthetic material is arranged. The core 2 is provided with a continuous bore 6 through which compressed air passes.

The device is further provided with two endless rows 7 of halves of die 8, 8a, each half of die of which has a semi tubular mould cavity provided with a ribbed profile 9, while the consecutive ribbed profiles constitute a helical- or transverse profile. This ribbed profile has wave valleys 9a and wave crests 9b, the undersides of the waves 9a being situated on a cylindrical surface. On a particular part of the track the endless rows 7, 7a cooperate and in this operative track the halves of die 8, 8a constitute a hollow mould 10.

The core 2 carries by means of a hollow rod 11 a closing means 12. In the hollow rod are provided openings 13 through which compressed air supplied via bore 6 can escape. The closing means may be constructed as a sealing means consisting of a plurality of metal discs 14 whereinbetween the circular rubber discs 15 are fixed. The outer diameter of these rubber discs is in a helical profiled plastic tube almost equal to the diameter of the cylinder on which is situated the underside of the wave valleys 9a of the ribbed profile minus the thickness of the plastic tubing 5, which is determined by the difference in distance between the outer side of the core 2 and the inner side of the casing 3. The casing is further provided with an extending part 3a which preferably reaches into the operative part of the halves of die.

Each endless row 7, 7a respectively of consecutive halves of die 8, 8a respectively runs over two sprockets which are spaced from each other, whereby the die halves 8, 8a respectively can be moved from a outer half of the track to an inner half of the track of the endless row 7, 7a respectively. These sprockets are denoted by the reference numerals 16 and 17, 16a and 17a respectively.

Figure 2:
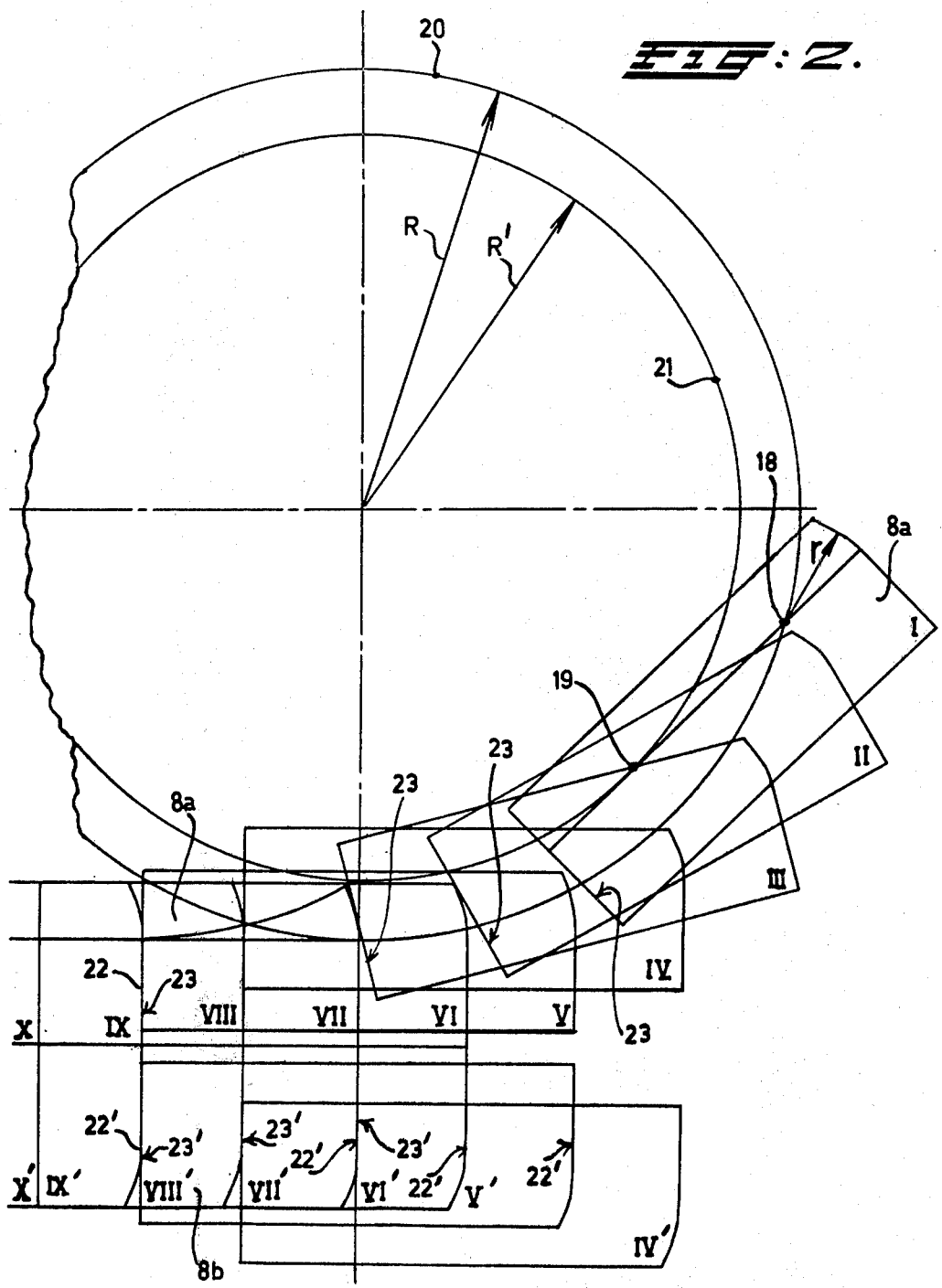
FIG. 2 shows a detail of the closing of the halves of die and the guiding thereof past the sprocket at the location of the extruder head.
Figure 3:
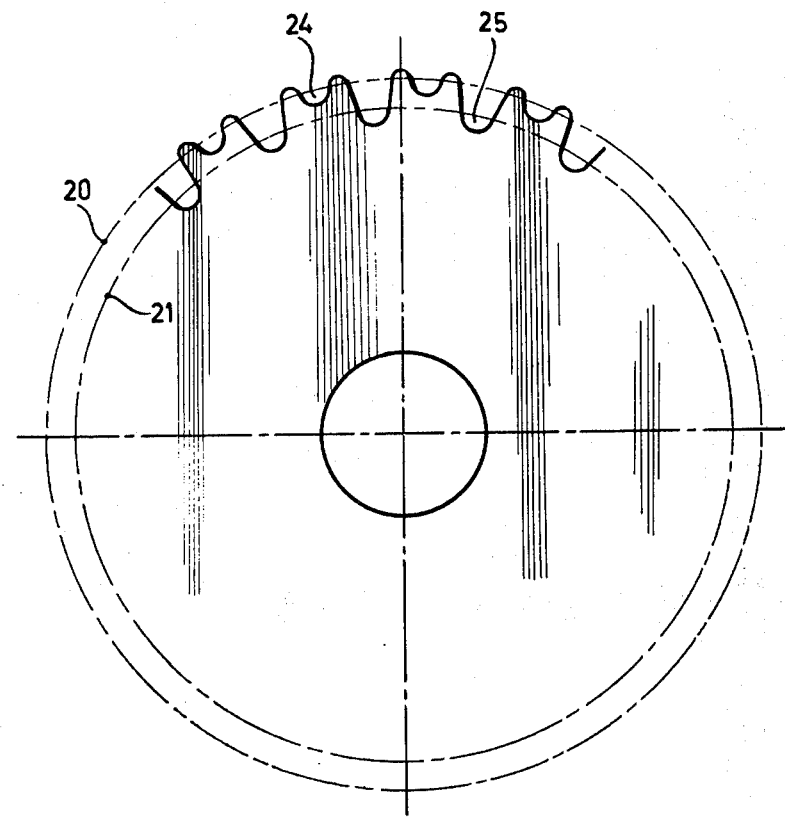
FIG. 3 is a view of a sprocket for the halves of die on which is partially indicated the toothing for carrying along the die halves.

The sprockets 16, 17 respectively consist of chain wheels with two pitch circles R and $R_1$. In FIG. 2 is represented a half of die from the upper endless row 7 in ten positions, the lower die half is represented in seven positions, while a die half 8a is represented with a trailing pivotal point 18 and a leading pivotal point 19. The trailing pivotal point 18 is guided over the sprocket recesses 24 with the greater pitch circle, while the leading pivotal point denoted by 19 of the half of die moves over the deeper sprocket recesses 25 with the pitch circle $R_1$ denoted by 21.

With reference to the consecutive positions denoted by the reference numerals I to X is illustrated how a half of die moves onto a point on which two halves 8, 8a respectively will unite so as to form a hollow mould.

It is visible in position IX that the back side 22 of a half of die completely contacts the lower front side 23 of the next half of die 8a.

The same applies to the faces 22' and 23' of the halves of die of the other row. As is to be seen the die halves 8a and 8 are not yet united to a hollow mould. This is only effected in the next stage.

It is, however, obvious that no synthetic material of the plastic tubing can come to lie between the back wall 22 and front wall 23 of two consecutive halves of die in the upper row and between the faces 22' and 23' in the lower row.

As is visible the consecutive halves of die are already in the position IV in a horizontal position, the die halves of two opposite rows lying, however, apart from each other so that they are not yet capable of forming together a complete hollow mould.

Consecutive halves of die 8b, 8c, 8d and so on are interconnected by connecting strips 26 with slots 27. In the slots 27 are pins 28 which are at one end of a next half of die, while second pins at the opposite end of an adjacent half of die are inserted without clearance into a connecting strip 26. The consecutive halves of die can independently from each other move by means of the slots 27.

Figure 4:
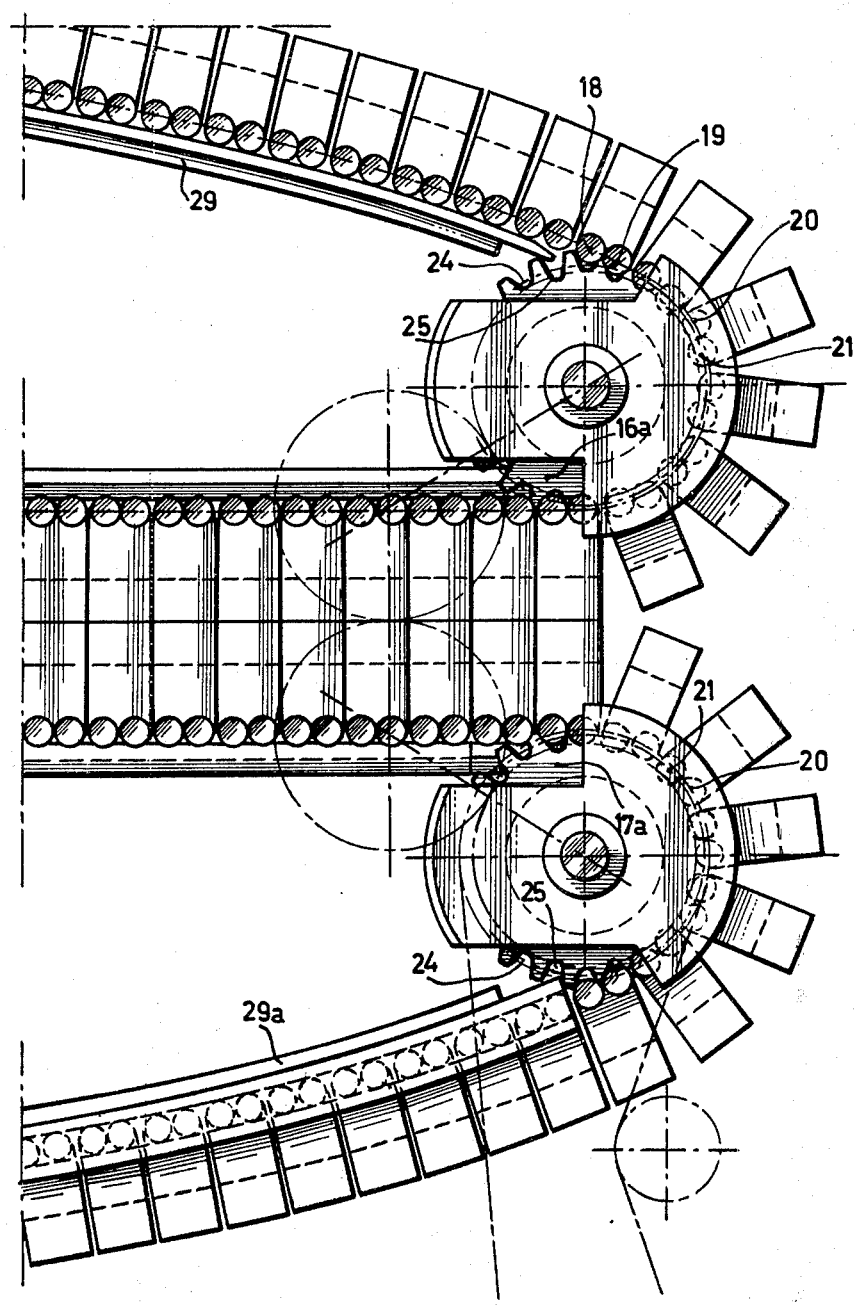
FIG. 4 shows a part of the device according to FIG. 1.
Figure 5:
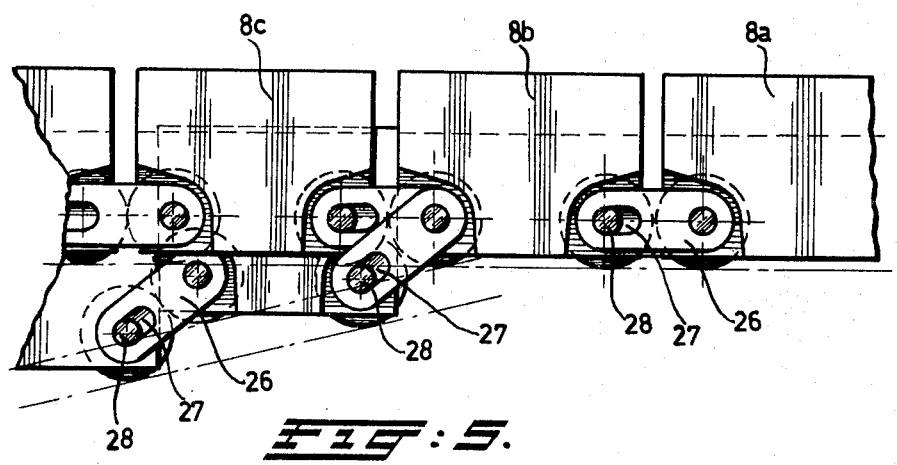
FIG. 5 is a view of a plurality of die halves.
Figure 6:
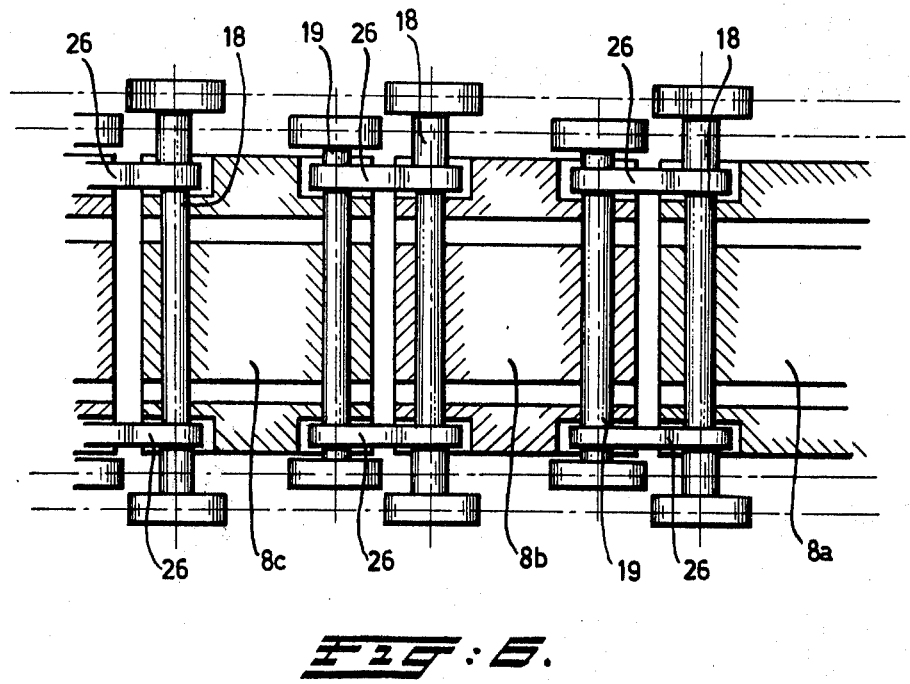
FIG. 6 is a plan view of the die halves according to FIG. 5.

In FIG. 4 is represented how the halves of die can move with respect to each other in order to ensure a connection of two die halves. It is obvious that the device may also be provided with endless belts which only on particular parts carry halves of die 7a, 8a.

Guide members 29 and 29a are provided enabling to bring the die halves about tangentially into contact with the pitch circles of the sprocket.

It is obvious that the halves of die may be provided with projections among which the projecting parts with a greater diameter can cooperate with the less deep recesses or toothings. It is evident that different sprockets can be used in order to provide the deeper, less deep recesses, respectively.

I claim:
1. A device for manufacturing corrugated tubing from a synthetic thermoplastic material comprising an extruder having an annular extrusion opening to extrude tubing therefrom and a core extending from the extruder within the extruded tubing, two endless rows of mold halves capable of forming complete dies with each other with each being moveable along endless guideways extending parallel to each other on opposing sides of said core, means spaced from said extruder for closing the interior of the extruded tubing and means operatively associated with said closing means for generating an overpressure within said extruded tubing between said extrusion opening and said closing means, each of said endless rows comprising an inner reach adjacent said core and an outer reach, a pair of spaced sprockets supporting the inner and outer reaches of each endless row and one sprocket being disposed proximate said extruder, said one sprocket of each endless row moving the respective mold halves from the outer reach to the inner reach to position opposed mold halves to define a hollow mold enclosing the extruded tubing, and means on each of said one sprockets for bringing adjoining surfaces of successive mold halves on an endless row into contact before said mold halves engage the extruded tubing so that said mold halves are moving only towards the extruded tubing, each half of said dies is provided with a leading pivotal point and a trailing pivotal point, and means operatively associated with said mold halves for guiding independently said pivot points such that prior to forming a complete mold the front face-lower side of a half contacts the adjoining face of the next preceeding half.

2. A device according to claim 1, wherein the pivotal points are guided over said sprockets with first deeper recesses, situated on a first pitch circle, and second more shallow recesses, situated on a second pitch circle, the trailing pivotal points of the halves of die being guided over the first pitch circle with the greater radius and the leading pivotal points over the second pitch circle with the smaller radius.

3. A device according to claim 1 wherein the means for generating an inner overpressure in the space between the annular opening and said closing means comprises a continuous bore through the annular mouth piece to introduce a gaseous compressed medium in between the annular opening and the said closing means.

* * * * *